(12) United States Patent
Shalev

(10) Patent No.: US 10,482,071 B1
(45) Date of Patent: Nov. 19, 2019

(54) SYSTEMS AND METHODS FOR PROVIDING METRICS FOR A PLURALITY OF STORAGE ENTITIES OF A MULTI-ARRAY DATA STORAGE SYSTEM

(71) Applicant: Pure Storage, Inc., Mountain View, CA (US)

(72) Inventor: Ori Shalev, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 586 days.

(21) Appl. No.: 15/007,043

(22) Filed: Jan. 26, 2016

(51) Int. Cl.
*G06F 16/00* (2019.01)
*G06F 16/21* (2019.01)

(52) U.S. Cl.
CPC .................. *G06F 16/214* (2019.01)

(58) Field of Classification Search
CPC .... G06F 16/214; G06F 3/0647; G06F 3/0653; G06F 3/0635; G06F 3/065; G06F 3/0619; G06F 3/067; G06F 3/0611; G06F 16/00; G06F 17/30132; G06F 17/30902; G06F 17/303; G06F 9/544; H04L 67/1097; H04L 67/2852; H04L 67/2842; H04L 67/18; H04L 67/10; G06Q 50/26; Y02P 90/18
See application file for complete search history.

(56) References Cited

U.S. PATENT DOCUMENTS

| | | | | |
|---|---|---|---|---|
| 7,873,619 B1 * | 1/2011 | Faibish | ............ | G06F 17/30091 707/705 |
| 8,554,918 B1 * | 10/2013 | Douglis | .............. | G06F 11/3485 707/640 |
| 8,555,027 B2 * | 10/2013 | Kimura | ................. | G06F 11/108 711/206 |
| 8,700,875 B1 * | 4/2014 | Barron | ................. | G06F 3/0605 711/170 |
| 9,459,809 B1 * | 10/2016 | Chen | ..................... | G06F 3/0644 |
| 9,513,814 B1 * | 12/2016 | Can | ......................... | G06F 3/061 711/114 |
| 9,830,111 B1 * | 11/2017 | Patiejunas | ............ | G06F 3/0625 |
| 9,891,860 B1 * | 2/2018 | Delgado | ................ | G06F 3/065 |
| 2006/0277226 A1 * | 12/2006 | Chikusa | ................. | G06F 16/10 707/E17.01 |
| 2007/0239793 A1 * | 10/2007 | Tyrrell | .................... | G06F 16/10 707/E17.01 |
| 2009/0083610 A1 * | 3/2009 | Arai | ..................... | G06F 3/0608 714/807 |
| 2009/0307422 A1 * | 12/2009 | Galloway | ........... | G06F 11/1076 711/114 |
| 2012/0159097 A1 * | 6/2012 | Jennas, II | ............. | G06F 3/0611 711/162 |

(Continued)

*Primary Examiner* — Anh Ly
(74) *Attorney, Agent, or Firm* — Womble Bond Dickinson (US) LLP

(57) ABSTRACT

Methods for providing metrics for a plurality of storage entities of a multi-array data storage system are disclosed. As a part of a method, data representing storage characteristics from one or more storage entities is collected and a selection of a storage entity of the one or more storage entities is allowed. Responsive to the selection, a value is presented that is indicative of a predicted impact on the selected storage entity when data migration is performed. The predicted impact is determined based on the amount of shared data between the selected entity and at least one other storage entity.

18 Claims, 5 Drawing Sheets

(56) References Cited

U.S. PATENT DOCUMENTS

| | | | | |
|---|---|---|---|---|
| 2013/0145091 A1* | 6/2013 | Klemm | ............... | G06F 3/061 |
| | | | | 711/114 |
| 2013/0185508 A1* | 7/2013 | Talagala | ............ | G06F 12/0871 |
| | | | | 711/118 |
| 2014/0289739 A1* | 9/2014 | Bodzsar | ............... | G06F 9/544 |
| | | | | 719/312 |
| 2015/0172120 A1* | 6/2015 | Dwarampudi | ............ | G06F 3/06 |
| | | | | 709/221 |

\* cited by examiner

SYSTEMS AND METHODS FOR PROVIDING METRICS FOR A PLURALITY OF STORAGE ENTITIES OF A MULTI-ARRAY DATA STORAGE SYSTEM

BACKGROUND

Enterprise storage is computer data storage that is designed for the large-scale, high-technology environments of modern enterprises. In such systems, storage administrators must manage multiple arrays with multiple storage entities (such as volumes and snapshots). For the administrators, there may be reasons to migrate volumes off of a particular array, e.g., space pressure, performance pressure, application requirements. Conventional tools used by storage administrators do not provide information that enables fully informed decision making regarding the migration or management of storage entities.

SUMMARY

Conventional tools used by storage administrators do not provide information that enables fully informed decision making regarding the migration or management of storage entities. A method for providing metrics for a plurality of storage entities of a multi-array storage system is disclosed that addresses the aforementioned shortcomings of conventional technologies. However, the claimed embodiments are not limited to implementations that address any or all of the aforementioned shortcomings. The method includes collecting data representing storage characteristics from one or more storage entities and allowing a selection of a storage entity of the one or more storage entities. Responsive to the selection, a value is presented that is indicative of a predicted impact on the selected storage entity when data migration is performed. The predicted impact is determined based on the amount of shared data between the selected entity and at least one other storage entity. As such, the method enables storage administrators to be provided with useful data regarding the impact of storage entity migration such that storage administrators are provided with information that enables them to make informed decisions regarding storage entity migrations.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1:
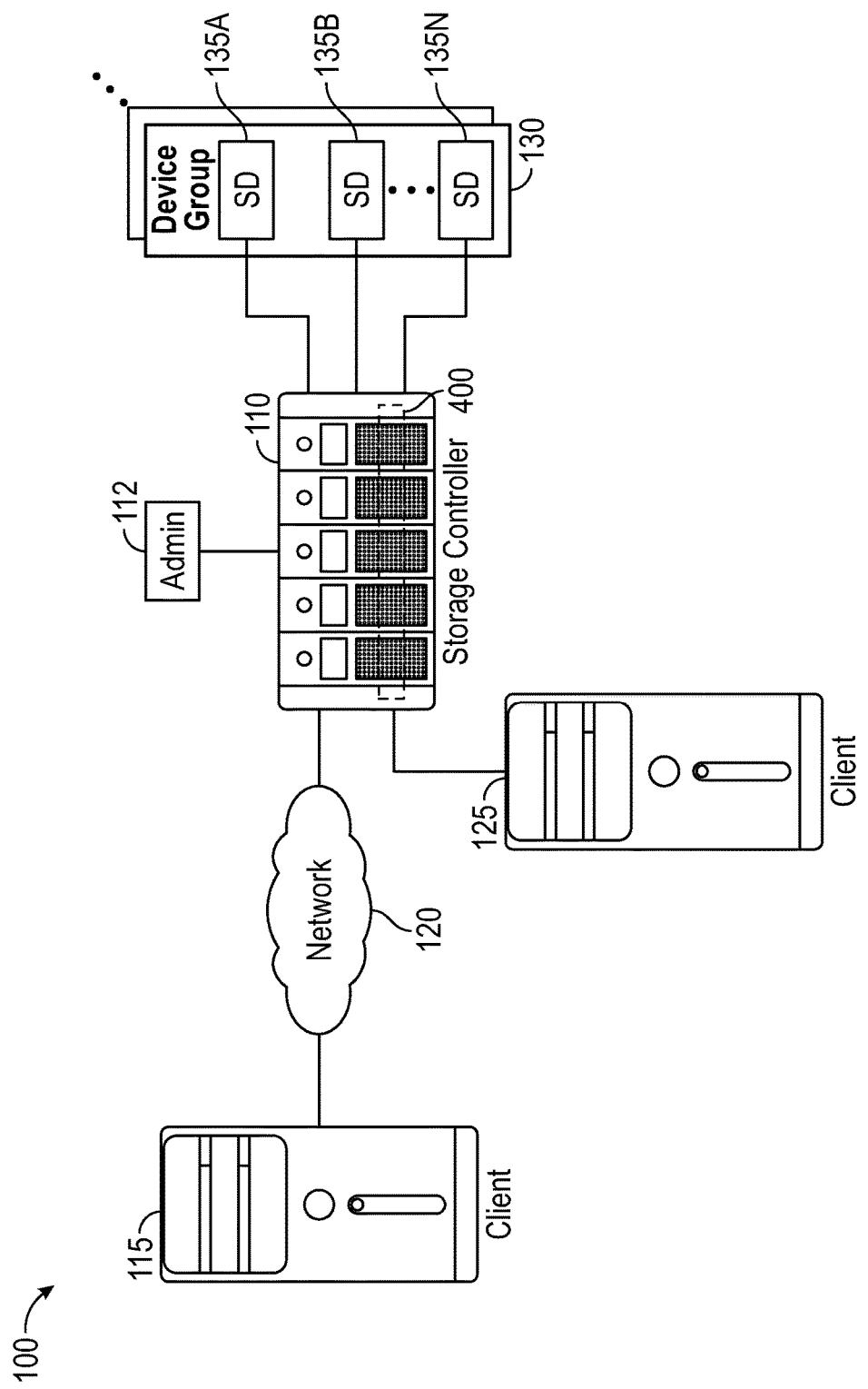
FIG. 1 shows an exemplary operating environment of a system for providing metrics for a plurality of storage entities of a multi-array data storage system according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "determining" or "displaying" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1 shows an exemplary operating environment 100 of a system for providing metrics for a plurality of storage entities of a multi-array data storage system. System 400 collects data representing storage characteristics of one or more storage entities of a multi-array storage system and provides a value indicative of a predicted impact of a migration of one or more of the storage entities. In one embodiment, system 400 provides useful data regarding the impact of storage entity migration such that storage administrators are provided with information that enables them to make informed decisions regarding storage entity migrations. FIG. 1 shows system 400, storage array controller 110, storage admin 112, client server 115, network 120, client server 125 and storage devices 135A-135N.

Referring to FIG. 1, exemplary environment 100 includes client servers 115 (remote) and 125 (local) which may access storage devices 135A-135N (e.g., storage arrays) via storage controller 110. In exemplary embodiments, there may be different numbers and types of local or remote servers. For example, client servers 115 and 125 are representative of any number and type of network devices.

Storage controller 110 may be coupled to remote client server 115 via network 120 and to local client server 125 through another network (e.g., local). In one embodiment, network 120 may be any type of network, including wireless, direct local area network (LAN), wide area network (WAN) such as the Internet, storage area network, Ethernet, and others.

In one embodiment, storage controller 110 may include hardware (e.g., circuitry, dedicated logic, programmable logic), software (e.g., executable program instructions), or a combination thereof. In one embodiment, storage controller 110 can include storage components within which system 400 resides. For example, in one embodiment, system 400 can be a part of an operating system (e.g., Purity™) of storage controller 110 or can be separate from the operating system in storage controller 110 but can work cooperatively therewith (for example as a part of separate software or firmware with components that operate on controller and/or on devices or components of storage devices 135A-135N).

In one embodiment, system 400 collects data representing storage characteristics from one or more storage entities and responsive to the selection of a storage entity presents a value indicative of a predicted impact of a hypothetical data migration involving the selected storage entity. In one embodiment the predicted impact can be determined based on the amount of shared data between the selected entity and at least one other storage entity. In other embodiments, other manners of determining the predicted impact can employed. In one embodiment, the storage entities reside in storage controller 110 coupled storage devices 135A-N, which are representative of any number and type (e.g., flash-based memory, solid state drive (SSD), disk) of storage devices. In one embodiment, the storage characteristics can be generated by storage characteristic monitoring and generating components that are a part of storage controller 110 and/or storage characteristic monitoring and generating components of storage devices 135A-135N. Data collected by system 400 can include but is not limited to metrics related to lists of arrays, volumes, snapshots and replication targets. In one embodiment, a selection can be allowed via a user interface. In other embodiments, a selection can be allowed in other ways such as by command line interface. The user interface can present user-visible representations of the one or more storage entities. In one embodiment, a selection can involve either a single or a plurality of storage entities. In one embodiment, a value can be presented in one or more of a plurality of manners. In one embodiment, the value can be presented using representations such as numbers, colors, or any other suitable graphical and/or textual indication. In one embodiment, system 400 can also present values representing metrics that are associated with each storage entity including metrics that represent relationships between the storage entities. Metrics can include but are not limited to workload correlation between volumes (if I/O traffic sent to a volume has correlation with other volumes), creation date, name similarity, size and application fingerprint.

Moreover, in addition, metrics can include but are not limited to duplicated data mappings, data reduction ratio, common snapshot origin, type of workload, pattern of workload, input/output per second (IOPS), input/output (IO) size, read/write composition, set of active initiators, traffic, lack of correlation. In one embodiment, for a period of time a correlation coefficient based on the statistics can be determined. In one embodiment, data metrics can be collected related to data reduction optimization. Such data reduction optimization can include but is not limited to data reduction ratio and data deduplication metrics.

When migrating storage entities, it can be useful to know as much as possible about expected effects of a migration. For example, if migrating a storage entity will effect data reduction ratio or slow down an application. As such, understanding real time correlations (or some functions of the real time correlations) between storage entities is advantageous.

In one embodiment, the graphical representation of storage entities, characteristics and relationships, such as are described above can be implemented in a variety of ways. For example, in one embodiment a GUI can be used to show many-to-many relationships among storage entities by presenting 2D or 3D views of the storage entities where the storage entities are depicted as nodes that are positioned in proximity to each other according to a percentage of shared data. In one embodiment, a GUI can present a graph in which storage entities are represented as nodes in which the proximity of the nodes is determined by a correlation coefficient. In one embodiment, the edges between the nodes can be labeled with a percentage or a range as a part of the presentation.

In one embodiment, as described herein, when a selection of a storage entity is made, relationships of the selected storage entity to other storage entities can be caused to appear in the user interface along with color/shape-coded information. The type of information displayed can depend on the action that is about to be taken. In one embodiment, the names of the other entities can appear in "bubbles" or other shapes near the selected entity. In one embodiment, a selection of a "detailed view" of the entity can show more detailed and accurate information about relationships. A user can hide all or parts of popped-up information temporarily or permanently. Moreover, the user can annotate depicted relationships. However, it should be appreciated that in addition to the foregoing, any suitable manner of depicting storage entities, characteristics and relationships can be used according to exemplary embodiments.

The above data provides information that facilitates an understanding of inter storage entity relationships, including many to many relationships, by providing a detailed view of such relationships. Because the migration of a storage entity from one storage array to another can depend on its correlation to other storage entities, a detailed view of such correlation (or some function of such correlation) can be very useful as regards informed decision making related to the migration of the storage entity.

Figure 2:
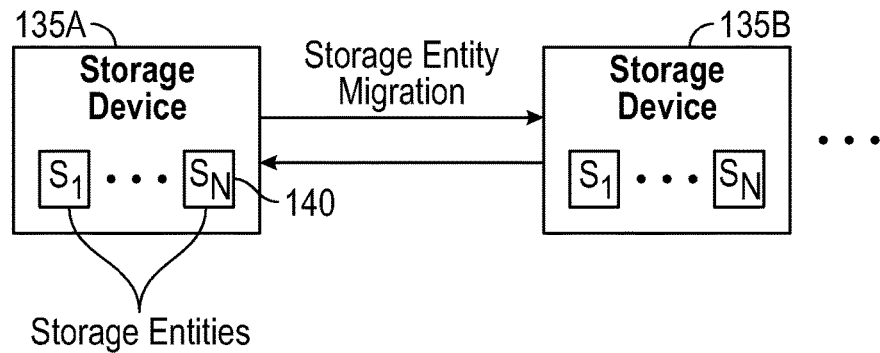
FIG. 2 illustrates storage entity residence and migration between storage devices.

FIG. 2 illustrates storage entity residence and migration between storage devices 135A and 135B. In one embodiment, each storage device 135A-N in FIG. 1 can include a plurality of storage entities S1-SN as shown in FIG. 2. In one embodiment, as shown in FIG. 2, storage entities S1-SN can be migrated between storage devices such as storage devices 135A and 135B. However, it should be appreciated that in one embodiment, they can be migrated between any of the storage devices 135A-N that are a part of the multi array data storage system.

Figure 3:
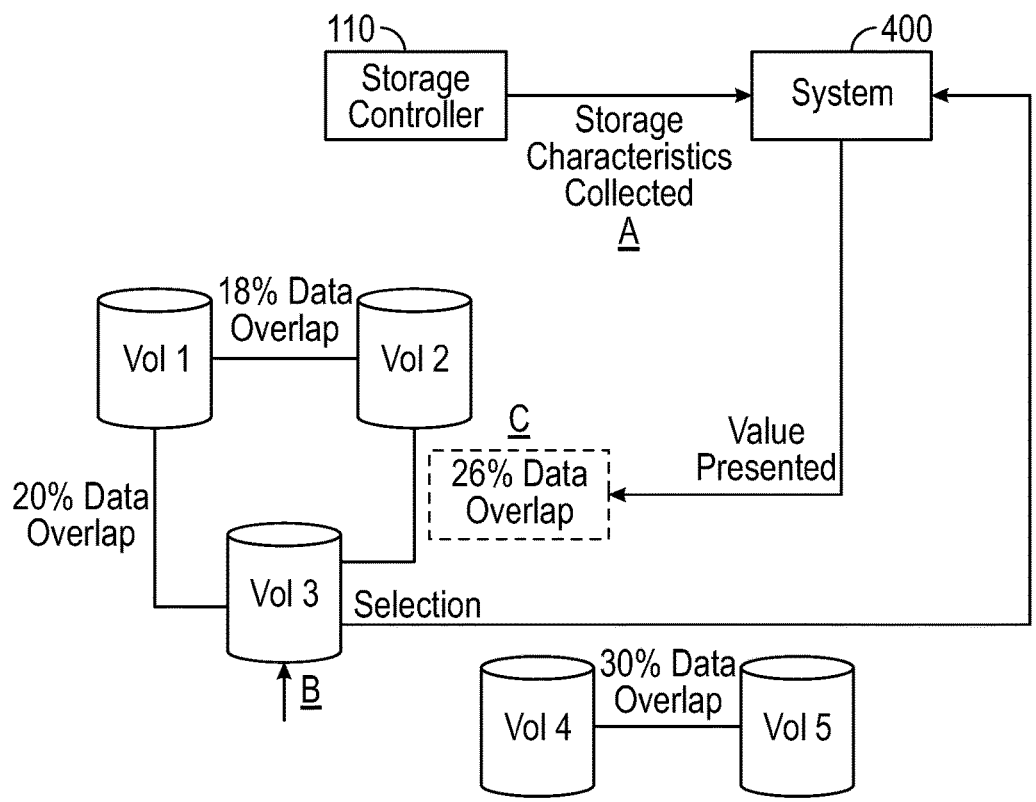
FIG. 3 illustrates the operation of a system for providing metrics for a plurality of storage entities of a multi-array data storage system according to one embodiment.

FIG. 3 illustrates the operation of system 400 for providing metrics for a plurality of storage entities of a multi-array data storage system according to one embodiment. These operations, relate to providing metrics for a plurality of storage entities of a multi-array data storage system. However, it should be appreciated that other operations that are not illustrated in FIG. 3 can be performed in accordance with one embodiment.

At A, data representing storage characteristics of one or more storage entities is collected by system 400. For example as shown in FIG. 3, storage characteristics can be collected from characteristic monitoring and generating components that are a part of storage controller 110 (e.g., 110 in FIG. 1).

At B, a selection of a storage entity of the one or more storage entities is allowed. For example, as shown in FIG. 3, VOL3 is allowed to be selected. In one embodiment, a selection can be allowed via a user interface that presents graphics such as those shown in FIG. 3. In other embodiments, a selection can be allowed via a user interface that presents graphics that are different from those that are shown in FIG. 3. Moreover, it should be appreciated that a selection can be allowed in any way that is suitable for making such a selection.

At C, responsive to the selection, a value is presented that is indicative of a predicted impact when data migration is performed. For example, as shown in FIG. 3, in response to the selection at B, a value, e.g., a determined percent of data overlap (see value encircled by dashed line in FIG. 3) is presented to provide an indication of the impact of migrating the storage entity. In one embodiment, data migration involves migration from one array to another array. In one embodiment, data migration can include data removal (e.g., migration to trash). In other embodiments, data migration may not include data removal.

Figure 4:
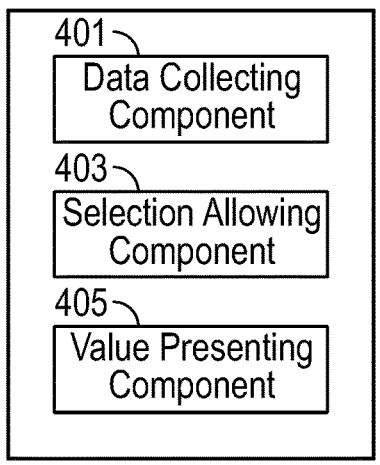
FIG. 4 shows components of a system for providing metrics for a plurality of storage entities of a multi-array data storage system according to one embodiment.

FIG. 4 shows components of a system 400 for providing metrics for a plurality of storage entities of a multi-array data storage system according to one embodiment. In one embodiment, the components of system 400 implement an algorithm for providing metrics for a plurality of storage entities of a multi-array data storage system. In the FIG. 4 embodiment components of system 400 include data collecting component 401, selection allowing component 403 and value presenting component 405.

Data collecting component 401 collects data representing storage characteristics from one or more storage entities. In one embodiment, data collected can include but is not limited to metrics related to lists of arrays, volumes, snapshots and replication targets. In one embodiment, the storage characteristics can be generated by storage characteristic monitoring and generating components that are a part of a storage controller (e.g., 110 in FIG. 1) and/or storage devices (e.g., 135A-135N in FIG. 1). In one embodiment, the data can be generated in an on-going manner as a part of the operation of the multi-array data storage system of which system 400 is part. In other embodiments, the data can be generated other than in an on-going manner as a part of the operation of one or more components of the multi-array data storage system of which system 400 is a part.

Selection allowing component 403 allows a selection of one or more storage entities. In one embodiment, a selection can be allowed via a user interface. In other embodiments, a selection can be allowed in other ways such by command line interface. In one embodiment, the user interface can present user-visible representations of the one or more storage entities.

Value presenting component 405 responsive to a selection, presents a value that is indicative of a predicted impact when data migration is performed. In one embodiment the predicted impact can be determined based on the amount of shared data between the selected entity and at least one other storage entity. In other embodiments, other manners of determining the predicted impact can employed. In one embodiment, value presenting component 405 can cause a value to be presented in one or more of a plurality of manners. In one embodiment, the value can be presented using representations such as numbers, colors, or any other suitable graphical and/or textual indication. In one embodiment, values representing metrics can be presented that are associated with each storage entity including metrics that represent relationships between the storage entities.

It should be appreciated that the aforementioned components of system 400 can be implemented in hardware or software or in a combination of both. In one embodiment, components and operations of system 400 can be encompassed by components and operations of one or more computer components (e.g., controller 110). In another embodiment, components and operations of system 400 can be separate from the aforementioned one or more computer components but can operate cooperatively with components and operations thereof.

Figure 5:
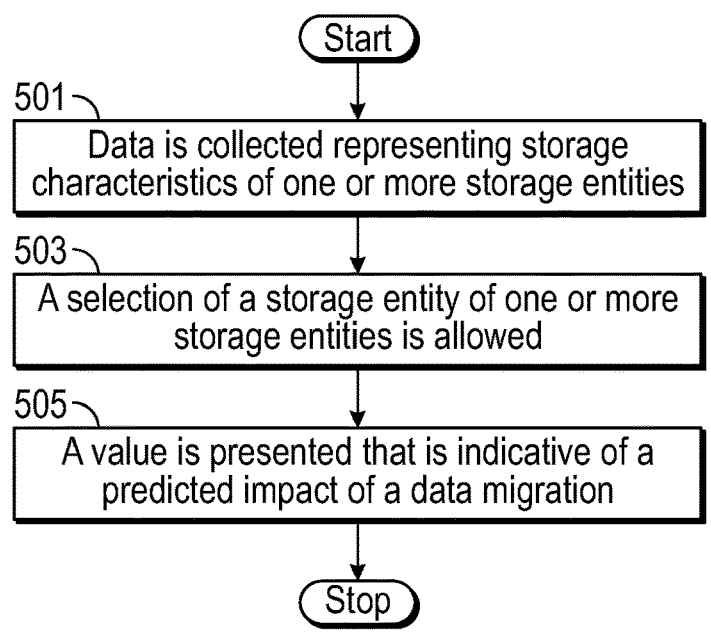
FIG. 5 shows a flowchart of a method for providing metrics for a plurality of storage entities of a multi-array data storage system according to one embodiment.

FIG. 5 shows a flowchart 500 of a method for providing metrics for a plurality of storage entities of a multi-array data storage system according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 5, at 501 data is collected representing storage characteristics from one or more storage entities (see collection component 401 described herein with reference to FIG. 4).

At 503, a selection of a storage entity of one or more storage entities is allowed (see selection allowing component 403 described herein with reference to FIG. 4).

At 505, a value is presented that is indicative of a predicted impact on the selected storage entity when a hypothetical data migration involving the selected storage entity is performed (see value presenting component 405 described herein with reference to FIG. 4). In one embodiment the predicted impact can be determined based on the amount of shared data between the selected entity and at least one other storage entity. In other embodiments, other manners of determining the predicted impact can be employed.

Figure 6:
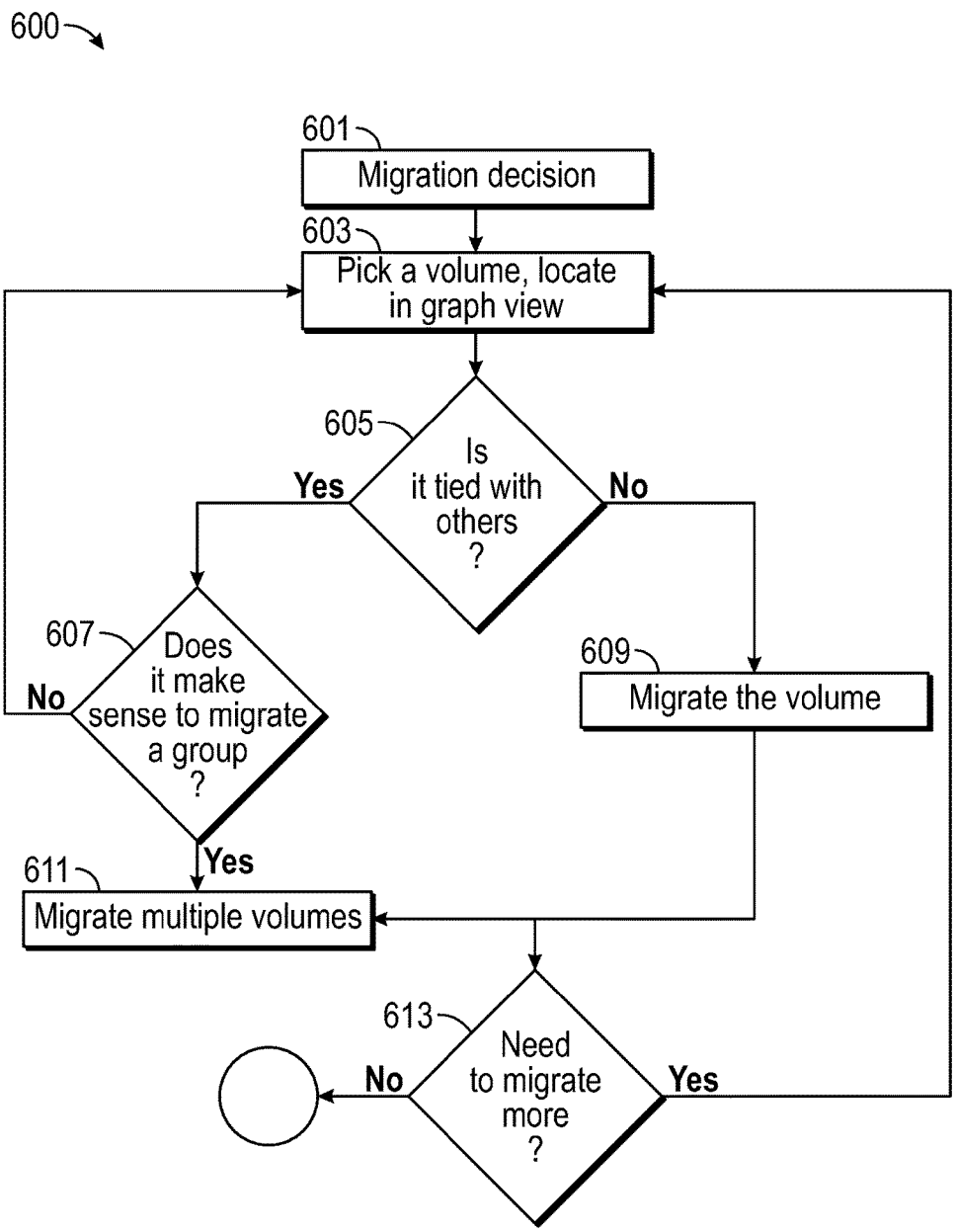
FIG. 6 is a flowchart of a method for providing metrics for a plurality of storage entities of a multi-array data storage system according to one embodiment.

FIG. 6 is a flowchart of a method for providing metrics for a plurality of storage entities of a multi-array data storage system according to one embodiment. Referring to FIG. 6, at 601 a migration decision is made by a system user such as a storage administrator. At 603, a storage entity (e.g., a "volume" in the FIG. 6 embodiment) selected. At 605 it is determined if the selected volume is tied to (has correlations with) other volumes. If it is determined that the selected volume is not tied to other volumes, at 609, the volume is migrated. If it is determined that the selected volume is tied to other volumes, at 607, it is determined if a group of volumes should be migrated. If it is determined that a group of volumes should be migrated, at 611, multiple volumes are migrated. If it is determined that a group of volumes should not be migrated, control is returned to 603. At 613 it is determined if more volumes should be migrated. If it is determined that more volumes should be migrated control is returned to 603. However, if it is determined that more volumes should not be migrated the method is completed.

In one embodiment, as discussed herein in detail above, relationships between different storage entities are provided (such as for view by a storage administrator). In one embodiment, storage entities can include but are not limited to arrays, volumes, snapshots and replication targets. In one embodiment, for each storage entity a variety of metrics (e.g., characteristics) that indicate relationships that a storage entity has with other storage entities can be provided in a display (or command line tool). For example, if the storage controller (e.g., 110 in FIG. 1) maintains information on the amount of physical data that is common to a pair (or set) of entities, that amount could be caused to appear in a GUI as a number, color, or any graphical or textual indication.

In one embodiment, a storage controller (e.g., 110 in FIG. 1), or storage cluster management system, can maintain various metrics that are associated with storage entities. A user interface, command line tool or remote application programming interface (API) can present this information. In one embodiment, as described herein, when a selection of a storage entity is made, relationships of the selected storage entity to other storage entities can be caused to appear in the user interface along with color/shape-coded information. In one embodiment, the type of information displayed can depend on the action that is about to be taken. In one embodiment, the names of the other entities can appear in "bubbles" or other shapes near the selected entity. A selection of a detailed view of the entity can show more detailed and accurate information about relationships. A user can hide all or parts of popped-up information temporarily or permanently. And, the user can annotate relationships.

Figure 7:
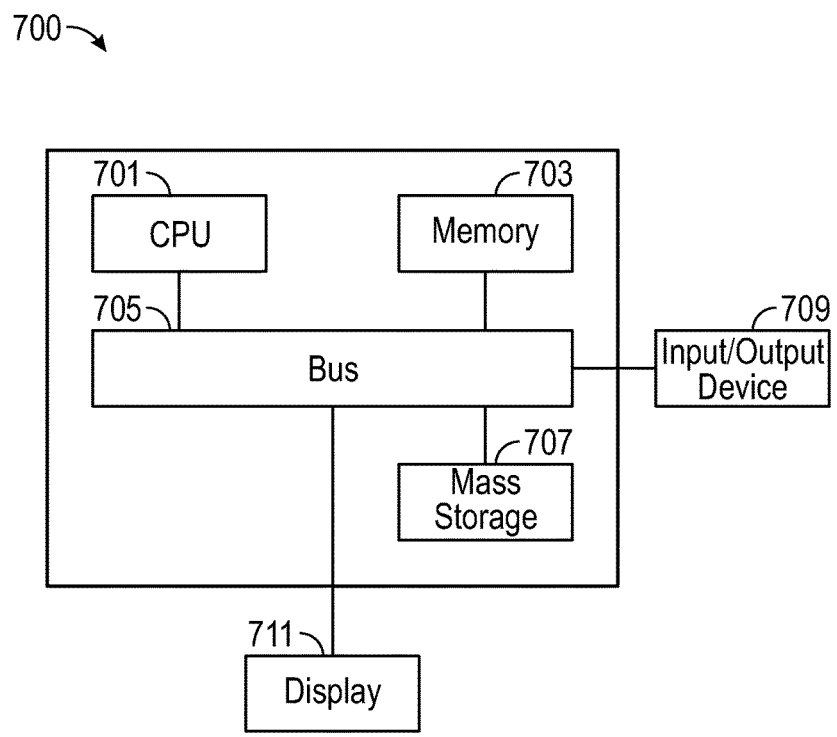
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for a storage node, a non-volatile solid state storage unit of the storage array, and/or system 400 in accordance with some embodiments. The computing device includes a central processing unit (CPU) 701, which is coupled through a bus 705 to a memory 703, and mass storage device 707. Mass storage device 707 represents a persistent data storage device such as a disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein with reference to FIGS. 1-6. The code embodying this functionality may be stored within memory 703 or mass storage device 707 for execution by a processor such as CPU 701 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing systems also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that while the embodiments are described with regard to a storage array, the embodiments may be extended to any device having to be configured for installation or reconfigured and is not limited to a storage array.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

With regard to exemplary embodiments thereof methods for providing metrics for a plurality of storage entities of a multi-array data storage system are disclosed. As a part of a method, data representing storage characteristics from one or more storage entities is collected and a selection of a storage entity of the one or more storage entities is allowed. Responsive to the selection, a value is presented that is indicative of a predicted impact when data migration is performed.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for providing metrics for a plurality of storage entities of a multi-array data storage system, performed by the storage system, the method comprising:
   collecting data representing storage characteristics from one or more storage entities;
   allowing a selection of a storage entity of the one or more storage entities;
   responsive to the selection, presenting through a user interface a value indicative of a predicted impact on the selected storage entity when data migration is performed wherein the predicted impact is determined based on the amount of shared data between the selected entity and at least one other storage entity, and presenting additional information at one or more storage entities sharing a common storage characteristic with the selected storage entity.

2. The method of claim 1 further comprising the predicted impact is based on data overlap between storage entities and involves physical space usage.

3. The method of claim 1 wherein presenting additional information at one or more storage entities indicates a selection of the one or more storage entities that will cause an improvement of allocated space in the storage system.

4. The method of claim 1 wherein presenting additional information at one or more storage entities indicates a change to the data reduction ratio in the storage system.

5. The method of claim 1 wherein presenting additional information at one or more storage entities indicates a selection of the one or more storage entities that will cause an improvement in overall performance of the storage system.

6. The method of claim 1 further comprises a migration of one or more storage entities when the value indicative of a predicted impact is above a given threshold.

7. A multi-array storage system comprising:
   a plurality of storage arrays, wherein each of the plurality of storage arrays comprises:
   a memory; and
   a processing unit having a processor configured to execute actions, the actions comprising:
   collecting data representing storage characteristics from one or more storage entities;
   allowing a selection of a storage entity of the one or more storage entities;
   responsive to the selection, presenting through a user interface a value indicative of a predicted impact on the selected storage entity when data migration is performed, wherein the presenting comprises a user-visible representation of the value.

8. The multi-array storage system of claim 7 further comprising presenting additional information at one or more storage entities sharing a common storage characteristic with the selected storage entity.

9. The multi-array storage system of claim 8 wherein presenting additional information at one or more storage entities indicates a selection of the one or more storage entities that will cause an improvement of allocated space in the storage system.

10. The multi-array storage system of claim 8 wherein presenting additional information at one or more storage entities indicates a change to the data reduction ratio in the storage system.

11. The multi-array storage system of claim 8 wherein presenting additional information at one or more storage entities indicates a selection of the one or more storage entities that will cause an improvement in overall performance of the storage system.

12. The multi-array storage system of claim 7 wherein the predicted impact is based on data overlap between storage entities and involves physical space usage.

13. The multi-array storage system of claim 7 further comprises a migration of one or more storage entities when the value indicative of a predicted impact is above a given threshold.

14. A non-transitory computer readable medium containing instructions for causing
a computer to perform a method, the method comprising:
collecting data representing storage characteristics from one or more storage entities;
allowing a selection of a storage entity through a user interface according to a value indicative of a predicted impact on the selected storage entity when data migration is performed, wherein the predicted impact is based on data overlap between storage entities and involves physical space usage.

15. The computer readable medium of claim 14 wherein the method further comprises presenting additional information at one or more storage entities sharing a common storage characteristic with the selected storage entity.

16. The computer readable medium of claim 15 wherein presenting additional information at one or more storage entities indicates a selection of the one or more storage entities that will cause an improvement of allocated space in the storage system.

17. The computer readable medium of claim 15 wherein presenting additional information at one or more storage entities indicates a change to the data reduction ratio in the storage system.

18. The computer readable medium of claim 14 wherein the predicted impact is based on data overlap between storage entities and involves physical space usage.

* * * * *